(12) United States Patent
Fitz et al.

(10) Patent No.: US 7,513,348 B2
(45) Date of Patent: Apr. 7, 2009

(54) ONE-WAY DRIVE DEVICE AND METHOD OF MAKING THE SAME

(75) Inventors: Frank A. Fitz, Poway, CA (US); Wayne K. Higashi, Los Gatos, CA (US)

(73) Assignee: EPX,LP, a California Partnership, Los Gatos, CA (US)

( * ) Notice: Subject to any disclaimer, the term of this patent is extended or adjusted under 35 U.S.C. 154(b) by 359 days.

(21) Appl. No.: 11/455,320

(22) Filed: Jun. 19, 2006

(65) Prior Publication Data

US 2007/0289832 A1    Dec. 20, 2007

(51) Int. Cl.
*F16D 41/18* (2006.01)
*B21D 22/02* (2006.01)

(52) U.S. Cl. .................... 192/46; 72/362; 192/69.1; 192/108

(58) Field of Classification Search ............... 192/69.1
See application file for complete search history.

(56) References Cited

U.S. PATENT DOCUMENTS

| | | | |
|---|---|---|---|
| 5,070,978 A | 12/1991 | Pires | |
| 5,678,668 A | 10/1997 | Sink | |
| 5,918,715 A | 7/1999 | Ruth et al. | |
| 6,125,980 A | 10/2000 | Ruth et al. | |
| 6,186,299 B1 | 2/2001 | Ruth | |
| 6,193,038 B1 * | 2/2001 | Scott et al. | 192/46 |
| 6,333,112 B1 | 12/2001 | Field | |

\* cited by examiner

*Primary Examiner*—Rodney H Bonck
(74) *Attorney, Agent, or Firm*—Barry N. Young

(57) ABSTRACT

There is disclosed herein a one-way drive device including a first member mounted for rotation about a given axis and defining (i) a first planar surface normal to the axis, and (ii) a first shoulder within the first surface. The device also includes a second member mounted for rotation about the same given axis and defining (i) a second planar surface, which is positioned in close proximity to and in confronting relationship with said first surface, and (ii) a second shoulder within the second surface. A coupling arrangement, which couples the two members to one another in a one-way drive manner, also forms part of the overall device and includes at least one strut movable between (i) a first position so as to allow the first member to rotate about the axis in one direction relative to the second member, and (ii) a second position in simultaneous engagement with the first and second shoulders so as to prevent the first member from rotating about the axis in the opposite direction relative to the second member. Each of the first and second members is preferably integrally stamp formed into a single unit.

12 Claims, 13 Drawing Sheets

SECTION A-A

SECTION B-B

SECTION A-A

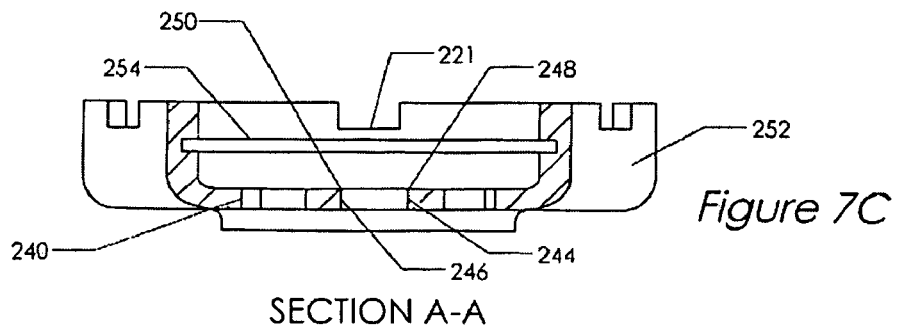
Figure 7C
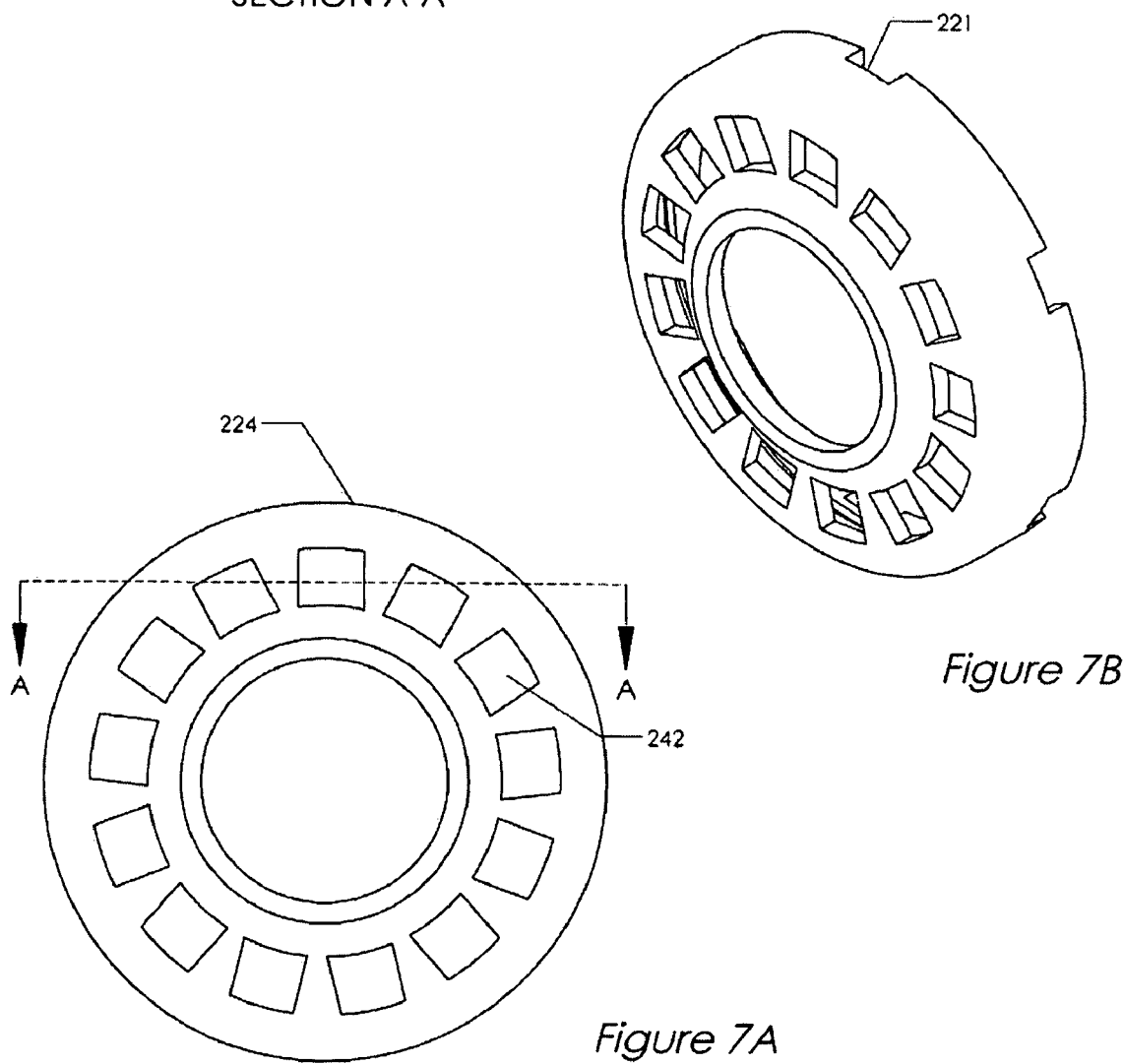
Figure 7B
Figure 7A

Figure 10A
Figure 10B
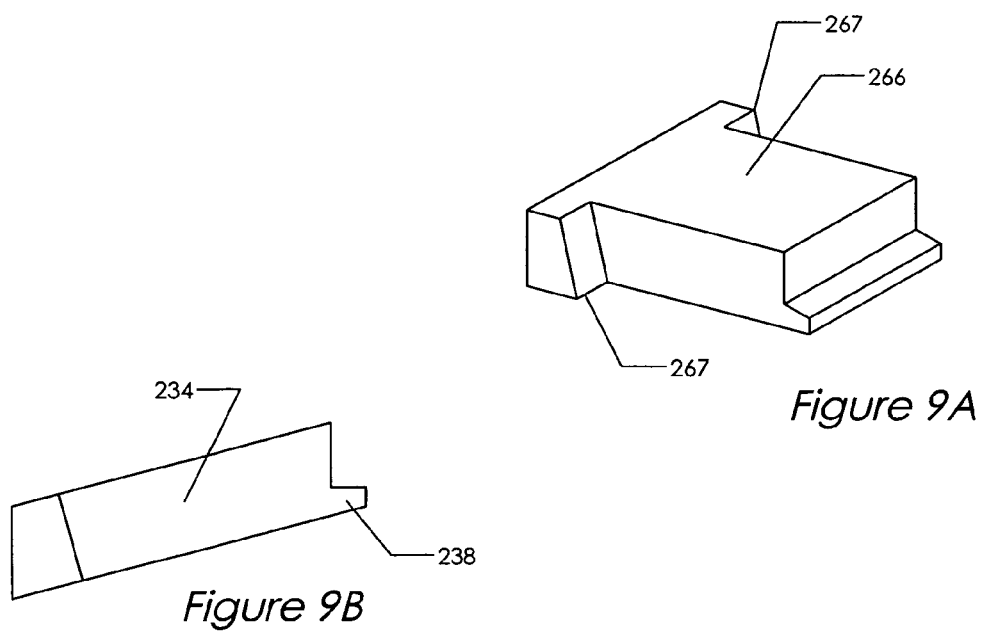
Figure 9A
Figure 9B

SECTION A-A

DETAIL B
SCALE 2 : 1

SECTION A-A    *Figure 18B*

ONE-WAY DRIVE DEVICE AND METHOD OF MAKING THE SAME

FIELD/BACKGROUND

The present invention relates generally to one-way drive devices and, more particularly, to methods of making such devices by means of integral stamp forming.

Example of an excellent prior art one-way drive device is described in the U.S. Pat. No. 5,070,978 (the Pires Patent), which is incorporated herein by reference. For the convenience of the reader, FIGS. 5, 5A, 6 and 7 are illustrated here as FIG. 1. Note that both the figure numbers and the reference numerals from the Pires Patent have been retained in the present FIG. 1. What is illustrated in this group of figures is a one-way drive device 60, which includes a strut or pocket plate 74 and a receptor or notch plate 76, which are mounted for rotation about axis 63 in confronting relationship to one another. The pocket plate 74 is shown including a pocket 88 in its confronting surface while the notch plate 76 is shown including a notch 92 in its confronting surface. In fact, while not shown in the specific figures of the Pires Patent shown in FIG. 1, the actual device described there includes a number of pockets 88 and a number of notches 92 (see, for example, FIGS. 8 and 9 in the Pires Patent). A strut assembly including a strut 94 and biasing spring 104 is shown mounted with the pocket plate so as to allow the strut to move between (i) the first position (FIG. 6 in the Pires Patent) so as to allow the pocket plate 74 to rotate about axis 63 in one direction relative to notch plate 76, and (ii) a second position (FIG. 7 in the Pires Patent) in simultaneous engagement with opposing shoulders formed by pocket 88 and notch 92 so as to prevent the pocket plate from rotating about axis 63 in the opposite direction relative to the notch plate.

For a more detailed description of one-way drive number 60, reference is made to the Pires patent itself. It suffices here to note that in an actual commercial embodiment of the one-way drive device described in the Pires Patent, the pocket plate 74 and the notch plate 76 are molded from powered metal, this being the preferred method of making the device by its manufacturer. In a similar vein, the pocket plate and the notch plate could be and have been formed by means of machining those parts. In either case, the one-way drive device formed by these methods has found great success in the marketplace and, technically speaking, has been found to operate quite reliably for its intended purpose. Nevertheless, as will be seen hereinafter, Applicants have discovered a way of manufacturing the one-way drive device much more economically while retaining its technical integrity. More specifically, Applicants have discovered that both the pocket plate and the notch plate can be made by means of integral stamp forming rather than by means of molding or machining and still produce a technically acceptable one-way drive device.

A more particular method of manufacture contemplated by Applicants has been the use of fine blanking, which is illustrated in FIG. 2 and which is well known in the art. Therefore, this process, which is generally indicated at 200 will not be described in detail. It suffices merely to note that the work piece 202, for example, a pocket plate or a notch plate, is positioned between opposing guide and die plates 204 and 206, respectively, having the appropriate passageways corresponding to the pockets or notches to be stamped formed. To this end, cooperating punches 207 and ejectors 208 are provided for establishing blanking and counter pressures. Again, this process is well known in the art and hence will not be described further herein.

What is to be noted, however, is the prior belief by those with ordinary skill in the art, at least to Applicants' knowledge, that such an approach, that is stamp forming, would make it quite difficult to achieve at least commercially the desired "resolution" of the one-way drive device required by a one-way drive device (to be explained below) as compared to one manufactured by means of molding or machining. To illustrate this best, reference is made to FIGS. 3A-D. FIGS. 3A and B illustrate a notch plate 210 corresponding to previously discussed notch plate 76 forming part of the Pires device shown in FIG. 1. Notch plate 210, which is manufactured either by means of molding or machining, is in turn shown including a series of notches 212 circumferentially or annularly spaced around the outer periphery of the notch plate along its surface 214 that would confront the corresponding surface of a cooperating pocket plate. Note, in particular, that a relatively large number of notches can be provided owing to the fact that they can be positioned relatively close to one another as a result of the molding or machining process. The nature of these processes allows the space between notches to be minimized. FIGS. 3C and D illustrates a similar notch plate 210A, but one which is manufactured by means of fine blanking utilizing the process described in conjunction with FIG. 2. In this case, the notches 212A that are stamped into the surface 214A are spaced further from one another than the notices 212. Nevertheless, and quite surprising to Applicants, for a given notch plate size, a sufficient number of notches can be readily stamped formed such that the resolution of the overall device is not compromised beyond an acceptable limit.

What is meant by the resolution of the one-way drive device is the rotational back travel of the clutch in which the first one of the struts of the one-way drive device locks within a notch, thereby locking the notch and pocket plates together. The more pockets and notches that can be provided, the more often a strut can lock in place and the greater the resolution of the device. Again, to Applicants' surprise, from the standpoint of resolution, an acceptable one-way drive device can be made by means of stamp forming as compared to its molded or machined counterpart.

Another concern has been that the stamp forming process would weaken the notches in the notch plate due to the thinning of the notch plate walls resulting from that process. To explain this concern in more detail, attention is directed to FIGS. 3B and 3D. FIG. 3B is the sectional view (B-B) of the molded or machined notch plate illustrated in FIG. 3A. Note in particular the notch plate between adjacent notches is quite thick. Actually it retains the initial thickness of the notch plate. This is to be contrasted with the notch plate 210A shown in section (A-A) in FIG. 3D. Note, in particular, the material between and adjacent to each of the notches is thinner than the total thickness of the notch plate due to the effect of stretching of the material as a result of the stamp forming process. Applicants discovered this thinness does not compromise the structural integrity of the notch plate to an unacceptable limit. Indeed, Applicants have found that an overall one-way drive device can be manufactured quite economically using stamp formed pocket and notch plates while retaining the structural and technical integrity required to compete with its molded or machined counterpart.

Moreover, as will also be seen, in order to ensure its technical success, the stamp formed one-way drive device disclosed herein has been provided with certain novel technical details that are compatible with this more economical method of manufacturing the device.

SUMMARY OF THE DISCLOSURE

The present specification discloses a one-way drive device, which comprises a first member, a second member, and a coupling arrangement. The first member is mounted for rotation about a given axis and defines a first planar surface normal to the given axis and a first shoulder within the first surface. In a similar fashion, the second member is mounted for rotation about the same given axis and defines a second planar surface positioned in close proximity to and in confronting relationship with the first surface. The second member also defines a second shoulder within its second surface and both the first member and the second member are integrally stamp formed in single units. The coupling arrangement includes at least one strut movable between (i) a first position so as to allow the first member to rotate about the given axis in one direction relative to the second member and (ii) a second position in simultaneous engagement with the first and second shoulders so as to prevent the first member from rotating about the given axis in the opposite direction relative to the second member.

In one embodiment disclosed herein, the first member takes the form of a pocket plate including at least one pocket having a closed underside integrally stamp formed into its planar surface so as to define the first shoulder referred to immediately above. At the same time, in this embodiment, the second member takes the form of the notch plate having at least one notch, which includes a closed underside integrally stamp formed into its planar surface so as to define the second shoulder referred to immediately above. The strut that forms part of the coupling arrangement is disposed at least partially within this pocket for movement between the first and second positions recited above. In this closed pocket/notch embodiment, that is, in this embodiment in which the stamping process only partially pierces the pocket and notch plate so as to provide closed pockets and notches, care is taken with regard to the formation of the second shoulder at the edge in which it meets the planar surface of the second member. In particular, for reasons to be described hereinafter, the second shoulder and the planar surface of the second member define an outer edge having a radius of curvature no greater than about 0.030 inch. Again, the reason for and focus on this feature will become apparent hereinafter.

In the case of this one-way drive device having pocket plates having closed pockets and notch plates having closed notches, there is disclosed herein a method of achieving structural integrity by first establishing the desired height of its strut engaging shoulders and then selecting the starting thickness of the blank of material to be used to integrally stamp form the pocket and notch plates.

In the second embodiment disclosed in this specification, the pocket and notch plates are stamp formed so that the pocket or pockets or notch or notches have open undersides, that is, the pocket and notch plates are fully pierced. In this particular embodiment, as will be seen, the strut and the positional relationship between the opened pockets and notches are carefully designed to ensure that the strut does not inadvertently fall out of its open pocket through an aligned open notch during operation of the one-way drive device.

BRIEF DESCRIPTION OF THE DRAWINGS

FIGS. 7A-7C illustrate the fully pierced notch plate, by itself, forming part of the overall device of FIG. 4.

FIGS. 9A and 9B diagrammatically illustrate in perspective and side views a strut forming part of a coupling arrangement which, in turn, forms part of the overall device of FIG. 4.

FIGS. 10A and 10B diagrammatically illustrate in perspective view and side view a biasing spring which also forms part of the coupling arrangement recited immediately above.

FIGS. 18A-18C correspond to FIGS. 12, 14 and 15, respectively, with the exception that the one-way drive device illustrated in FIG. 18A is shown without its retaining disk 312 (see FIG. 14) and with certain dimensional and functional indicia being provided with the FIGS. 18A and 18C.

DETAILED DESCRIPTION

Figure 1:
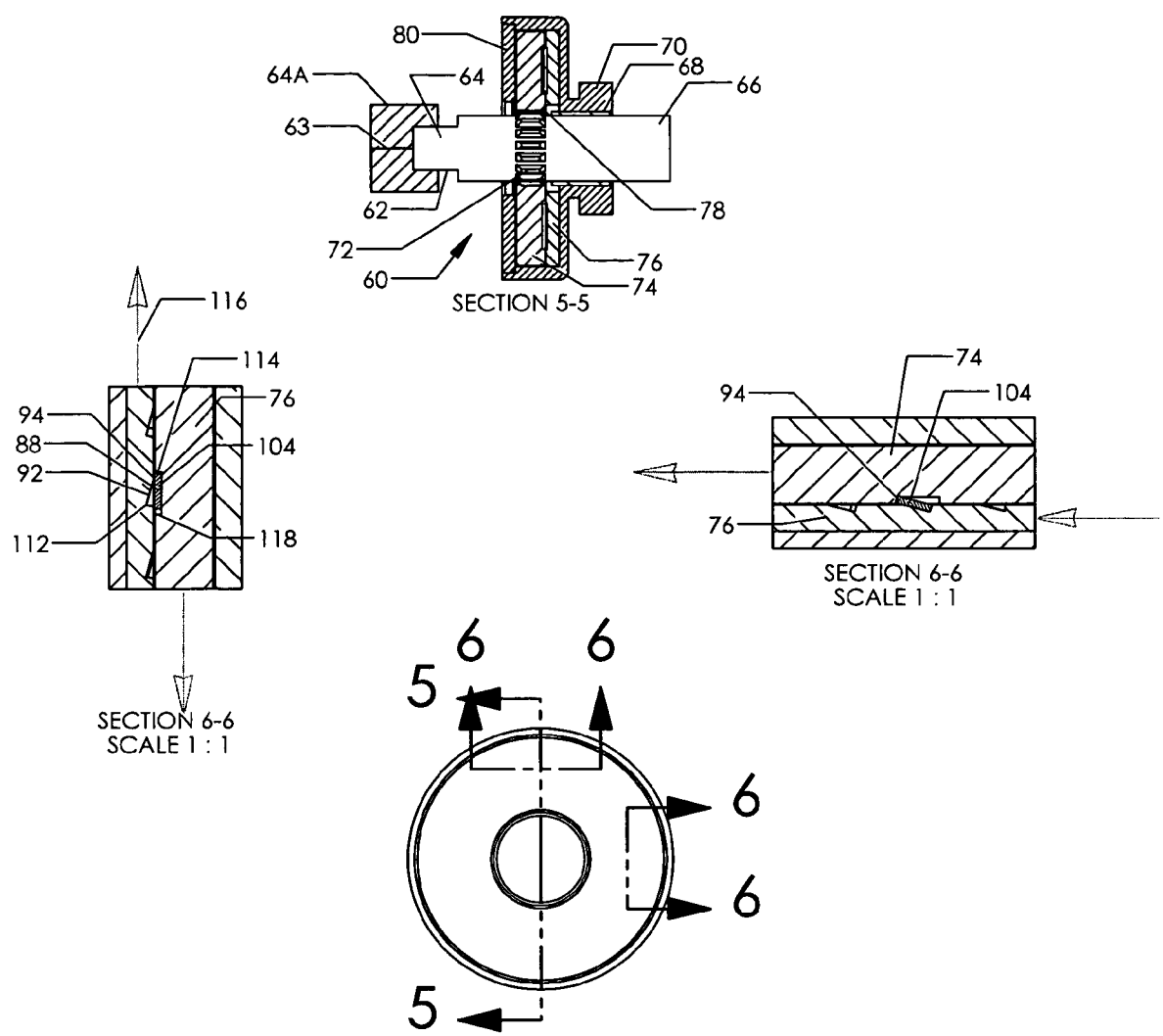
FIG. 1 is a group diagrammatic illustration of FIGS. 5, 5A, 6, and 7 forming part of U.S. Pat. No. 5,070,978.

Having discussed previously FIGS. 1 through 3A-D, attention is now directed to the remaining figures in the application, wherein like components are designated by like reference numerals throughout these latter figures. In particular, attention is now specifically directed to FIGS. 4 through 11 and what Applicants refer to as their fully pierced embodiment of a one-way drive device designed in accordance with a number of aspects of the present invention.

Figure 6:
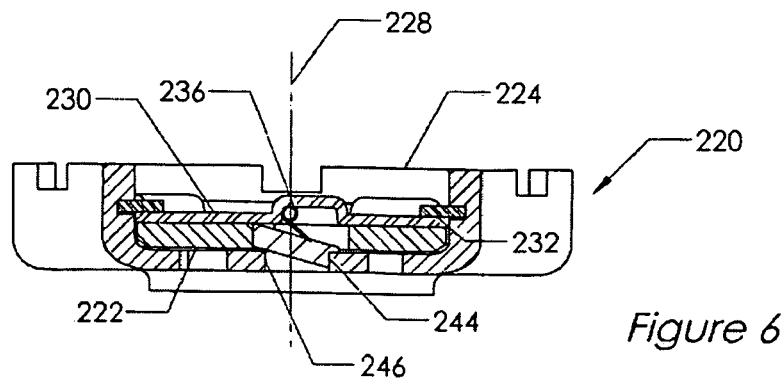
FIG. 6 is a sectional view of the device of FIG. 4 taken generally along the line A-A in FIG. 4.
Figure 5:
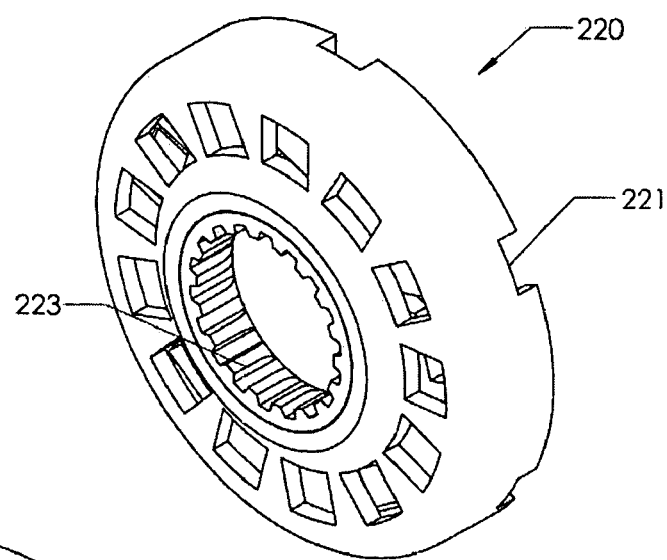
FIG. 5 diagrammatically illustrates the one-way drive device of FIG. 4 in perspective view.
Figure 4:
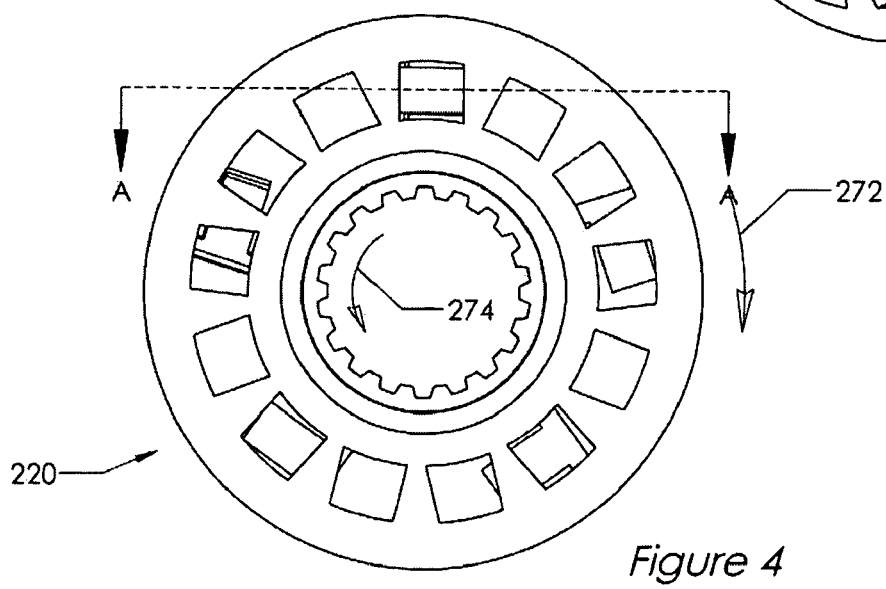
FIG. 4 is a diagrammatic illustration, in plan view, of a one-way drive device designed in accordance with one embodiment disclosed herein, namely, what will be referred to as a fully pierced embodiment for the reasons that will become apparent hereinafter.
Figure 6A:
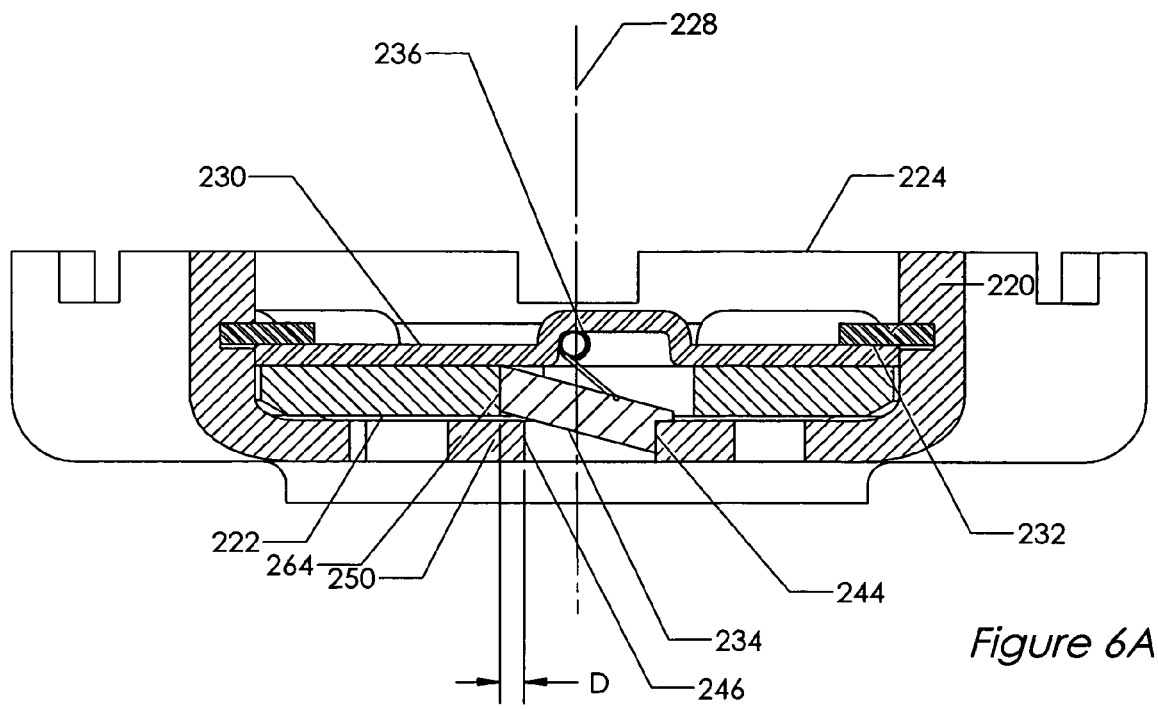
FIGS. 6A and 6B diagrammatically illustrate broken away details of the device shown in FIG. 6.

Referring specifically to FIGS. 4, 5, and 6, this overall one-way drive device is shown in an assembled condition, as generally indicated by the reference numeral 220. Device 220 includes a first member 222, the second member 224, and a coupling arrangement, which comprises a strut 234 and a biasing spring 236 and is generally shown in FIG. 6 and 6A. As will be seen hereinafter, first member 222 serves as a pocket plate while the second member 224 serves as a notch plate and the overall coupling arrangement serves to allow either one of these plates to rotate freely in one direction about a given axis 228 relative to the other plate while preventing the one plate from rotating in the opposite direction about axis 228 relative to the second member. This is, of course, the way in which a one-way clutch functions, as described in detail in the Pires Patent. However, in accordance with one aspect of the present invention, as indicated previously, both the pocket plate and the notch plate are integrally stamp formed into single units by any suitable and readily providable means such as the fine blanking process discussed previously in conjunction with FIG. 2.

It should also be noted here that overall drive device 220 includes a backing plate 230, which is also preferably formed into an integral unit by means of stamp forming. Moreover, overall device 220, as shown in FIGS. 4-6 includes a retaining ring 232 and the coupling arrangement includes both a strut 234 and a biasing spring 236, as previously indicated. As will be seen hereinafter, the strut itself is designed in accordance with another aspect of the present invention and the backing plate is provided because of the fully pierced design of device 220.

Referring now to FIGS. 7A-7C, attention is directed to notch plate 224 apart from the rest of the one-way drive device. This notch plate is stamp formed into an integral or single unit from any suitable and readily stamp formable material that is compatible with the overall structural integrity of the one-way drive device, for example, low carbon steel or alloy steel. As will be seen, the other stamp formed components forming part of device 220 would preferably be formed of the same material. In any event, the notch plate 224 is shown best in FIGS. 7B and 7C including torque transmitting connections 221, 223 that are conventionally provided in order to connect the notch plate and, therefore, the entire device to an external rotatable member in the manner illustrated in FIG. 5 of the Pires Patent (see our FIG. 1 in the present Specification). As will be seen hereinafter, similar torque transmitting connections (see FIGS. 8A and 8B) are provided on the pocket plate 222.

Referring particularly to FIG. 7C in conjunction with FIG. 6, notch plate 224 is shown including an annular planar surface 240 including a series of notches 242 arranged in annularly or circumferentially spaced relationship to one another around the planar surface 240, as best illustrated in FIG. 7A. Each of these notches includes an open underside. That is, when the notches are formed in the notch plate, the forming process fully pierces through the plate so that the notches are, in essence, through holes. For reasons to be discussed hereinafter, each of the fully pierced notches 242 includes a front shoulder 244 and an opposing back shoulder 246, which are best illustrated in FIG. 6A in conjunction with FIG. 7C. Moreover, and again for reasons to be explained hereinafter, the front shoulder 244 together with the annular surface 240 define a forward edge 248 while the back shoulder 246 in conjunction with the same annular surface 240 define a back edge 250.

Finally, the upwardly extending annular flange portion of the notch plate, as indicated at 252 in FIG. 7C, is shown including a machined formed groove 254 serving to accommodate the previously recited retaining ring 232 (see FIG. 6).

Figure 8C:
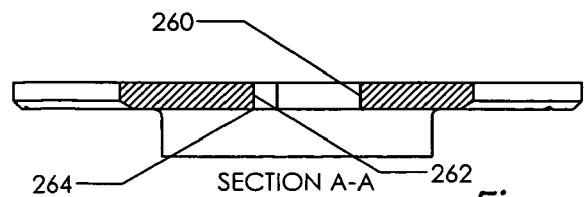
FIGS. 8A-8C illustrate the fully pierced pocket plate, by itself, forming part of the overall device of FIG. 4.
Figure 8B:
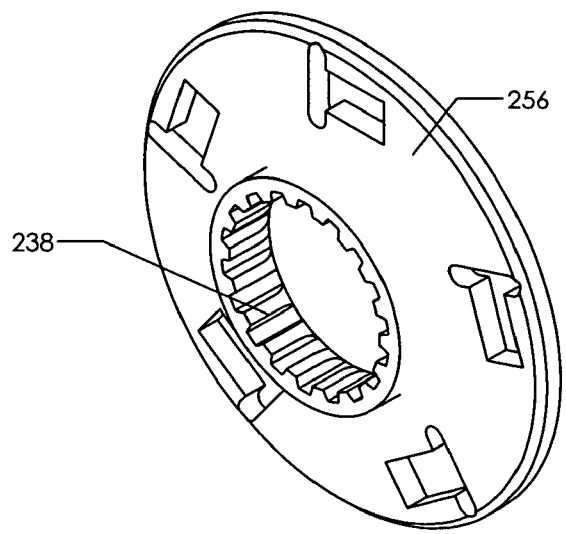
Figure 8A:
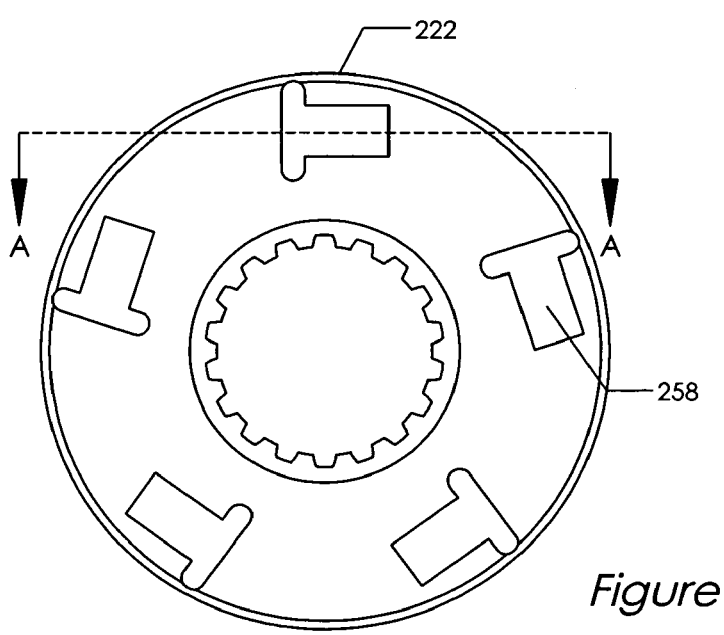

Having described notch plate 224, attention is now directed to the pocket plate 222, which is illustrated best in FIGS. 8A-8C. As seen there, the pocket plate includes an annular or circumferential planar surface 256 into which are formed a number of pockets 258, each of which is configured to accommodate a corresponding strut 234. Like notches 242, pockets 258 have open undersides, that is, they are formed by fully piercing through the pocket plate during the stamp forming process. As indicated previously, the pocket plate is provided with torque transmitting connections 238 and, when the pocket plate is stamp formed, it is stamp formed from any suitable stamp forming material that is compatible with the structural and functional integrity of the overall one-way drive device. Like the notches 242 in the notch plate, each pocket 258 includes a front shoulder 260 and the back shoulder 262, which are best illustrated in FIG. 6A in conjunction with FIG. 8C. For reasons to be explained hereinafter, it should be noted that this back shoulder 62 and the planar surface 56 of pocket plate 222 together define a back edge 264.

Referring now to FIGS. 9A and 9B, strut 34 is shown in detail including a main body 266 having rearward tee flanges 267 and, in accordance with an aspect of the present invention, a forwardly extended flange or nose 238. With the exception of this flange or nose, the strut itself is known in the prior art. The importance of nose 238 will be explained hereinafter. For the moment, it suffices to say that its relevance is associated with the fact that the notches and pockets have no undersides, that is, they are fully pierced.

FIGS. 10A and 10B illustrate in more detail the previously recited biasing spring 236, which may be conventionally provided and, hence, will not be discussed further herein other than to discuss hereinafter the part it plays in the overall function of the one-way drive device.

Figure 11C:
FIGS. 11A-11C diagrammatically illustrate a backing plate that forms part of the fully pierced one-way drive device of FIG. 4.
Figure 11B:
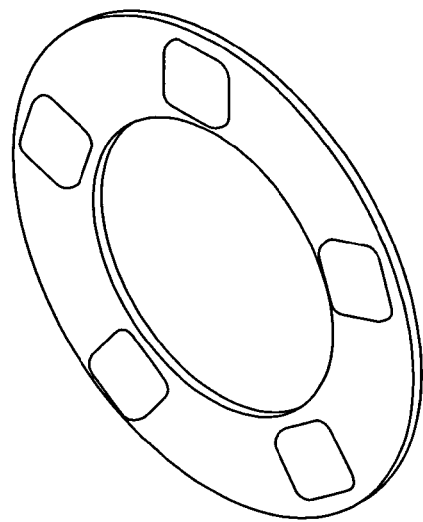
Figure 11A:
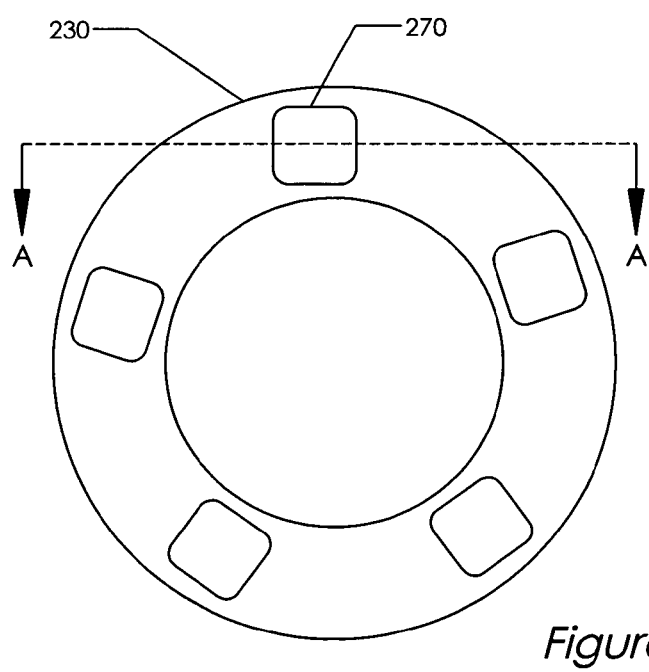

Turning now to FIGS. 11A-11C, backing plate 230 is shown in greater detail. As will be explained in more detail hereinafter, the backing plate is required because of the fully pierced nature of the notch and pocket plates. Like these latter plates, the backing plate is preferably stamp formed as a single unit from the same material as that of the notch and pocket plates. During this stamp forming process, a series of annularly or circumferentially spaced recesses 270, each of which is formed for accommodating a biasing spring 236.

Figure 6B:
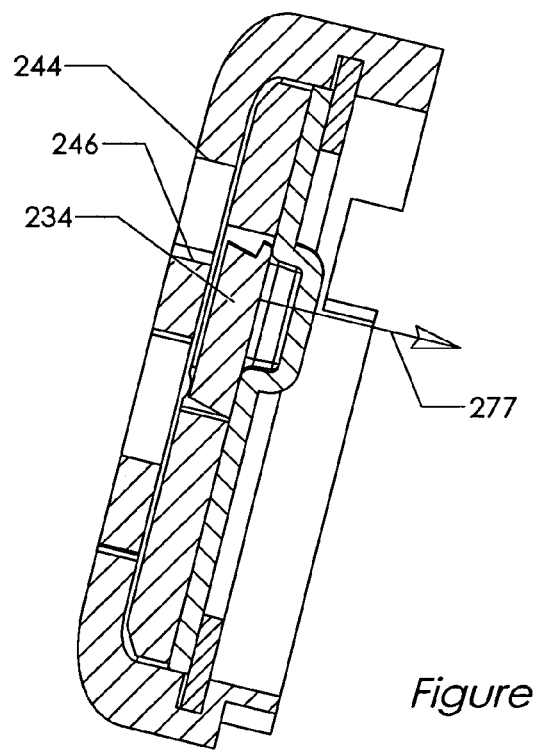

Returning to FIG. 6, in conjunction with FIGS. 6A and 6B, attention is directed to the way in which one-way drive device 220 is manufactured and assembled and the way in which it operates, especially with regard to certain unique features associated with its fully pierced nature. In the first place, as indicated previously, the notch plate, the pocket plate, and the backing plate are preferably stamp formed into individual unitary members. While this is preferred for economic reasons, it is to be understood that these components of the one-way drive device can be made in a more conventional way, that is, by means of molding or machining. In any event, as seen best in FIG. 6, the pocket plate 222 and the notch plate 224 are positioned adjacent one another such that their respective planar surfaces are in confronting relationship to one another and such that the plates are mounted for rotation about axis 228 in a concentric manner, as is usual with one-way drive devices. Each of the struts 234 is positioned within a corresponding pocket 258 in the manner shown in FIG. 6 so that it is movable between a first position entirely or substantially entirely within its pocket and a second position extending partially outside the pocket as shown particularly in FIG. 6. The spring 236 is disposed behind or above a corresponding strut within an aligned pocket 270 (see FIG. 11A) of backing plate 230 for biasing the strut in its extended position. Again, as best illustrated in FIG. 6, backing plate 230 is shown positioned behind and against the backside of pocket plate 222 so that each of its recesses 270 is positioned in alignment directly behind an associated pocket 258 for accommodating the biasing spring 236. The backing plate is held in this position by means of retaining ring 232 (see FIG. 6A), which is assembled within its cooperating groove 254 (see FIG. 7C).

With the overall device assembled in this manner, the notch plate 224 is able to rotate in the direction of arrow 272 (FIG. 4) relative to pocket plate 222 or, alternatively, it can be said that the pocket plate 222 is able to rotate in the direction of arrow 274 (FIG. 4) relative to the notch plate. This is because, during such relative movement, the struts 234 are forced up into their pockets by the notch plate against the forces of springs 236. On the other hand, if the notch plate attempts to move in the opposite direction relative to the pocket plate, that is, against arrow 272 or the pocket plate attempts to move against arrow 274 relative to the notch plate, as soon as the first strut 234 engages a notch 242, its associated biasing spring 236 forces it down into that notch and into engagement with the front shoulder 244 of that notch, as illustrated best in FIG. 6 and FIG. 6A.

The discussion immediately above relating to the way in which one-way drive device 220 is assembled and functions is it not particularly new and the corresponding description may be found in the Pires patent, that is, with the exception of the way in which the notch and pocket plates, backing plate and the struts are made and the way in which they function as a result of the fully pierced nature of the overall device. Moreover, there are important inventive details within this device as a result of its fully pierced nature, that is, because its notches and pockets have opened undersides. In this latter regard, it should be noted that while economically speaking the one-way drive device is preferably made by stamp forming, the fully pierced device could be made by means of molding or machining, as indicated previously. In either case, the details, which will now be discussed, would be important features of the device.

To this end, reference is made particularly to FIGS. 6A and 6B, starting with FIG. 6A. As seen there, the strut 234 is locked in its second position, that is, extending partially out of its pocket and against shoulder 244 of the notch plate at its front end and against shoulder 262 (FIG. 8C) of the pocket plate at its back end. In this regard, note particularly that nose 238 (FIG. 9B) on the forward top edge of the strut rests against the planar surface of the notch plate directly over edge 248 (FIG. 7C). But for this nose, the strut would be pushed through its associated notch by means of its biasing spring. In other words, the strut itself has been specifically designed to include this unique shape which includes nose 238.

While the nosed configuration of strut 234 is sufficient to hold the strut in place during its locking state, as illustrated in FIG. 6A, it is not sufficient to do so as the notch plate initially begins rotating in the direction of arrow 272 relative to the pocket plate as shown in FIG. 6B (or the pocket plate begins rotating in the rotation of arrow 274 relative to the notch plate, as shown best in FIG. 4). For purposes of simplicity, we will assume that the notch plate begins rotating in the direction of arrow 272 relative to the pocket plate from the initial position shown in FIG. 6A. In this regard, it is important to note the positional relationship between the back edges 250 and 264 of the notch and pocket plates, respectively, as shown in FIG. 6A. In particular, note that when the strut is locked in place, the edge 250 leads the edge 264 positionally, i.e., dimensional distance D. Selecting this dimensional distance in the overall design of the one-way drive device is quite important when the device is of the fully pierced type, as here. The reason for that is as follows. Referring to FIG. 6B in conjunction with FIGS. 6 and 6A, note that as the notch plate rotates in the direction of arrow 272 relative to the pocket plate, notched shoulder 244 moves forward (as part of the notch plate), thereby moving away from the nose 268 of strut 234 which stays with the pocket plate. As a result, the only thing preventing the biasing spring from pushing this strut entirely through the opened underside of its cooperating pocket is the edge 250 of the notch plate. While it is true that this edge is also moving forward as part of the notch plate, if it is not spaced a sufficient distance in front of edge 264 of the pocket plate, the strut will fall through the pocket before the edge 250 has a chance to prevent it from doing so. Therefore, it is important that the design of the overall one-way drive device takes this into account, that is, provides a sufficiently large dimensional distance D that ensures that edge 250 is able to move under the strut and push it back up into its corresponding pocket as indicated by arrow 277 before the strut is able to fall down into the notch. Obviously, this dimensional distance D depends upon the overall dimensional relationships of the parts making up the one-way drive device. However, in view of the present teachings herein, one with ordinary skill in the art can determine what that dimensional distance should be.

One additional point that should be noted regarding the fully pierced version of one way drive device 220. Because its pockets and notches have opened bottoms, the device itself cannot contain a closed system of lubricant. This device would need to be used in applications that provide retention of lubricant or where the device operation does not require constant immersion.

Turning now to FIGS. 12-15, attention is directed to one-way drive device 300, which is designed in accordance with a second embodiment disclosed herein. Like the one-way drive device 220, device 300 includes a first member 302 and a second member 304, which serve as pocket and notch plates, respectively. The device also includes a coupling arrangement 306 comprised of a strut 308 and biasing spring 310 and a retaining disc 312. Like the device 220, in a preferred embodiment, pocket plate 302 and notch plate 304 are made by means of stamp forming. However, as will be seen, in the case of device 300, the pockets in pocket plate 302 and the notches in notch plate 304 include closed undersides, that is, the plates are only partially pierced as opposed to their fully pierced counterparts in device 220. Otherwise, device 300 operates in the same general manner as device 220 and the one-way drive device described in the Pires Patent.

Figure 14:
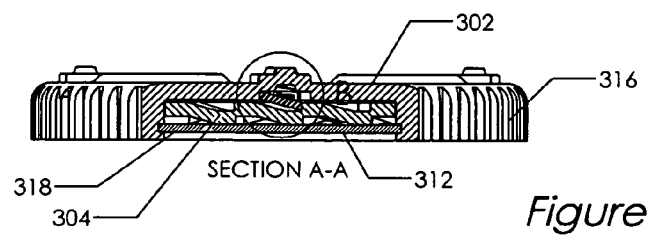
FIG. 14 illustrates a sectional view of the device of FIG. 12, taken generally along line A-A in FIG. 12.
Figure 15:
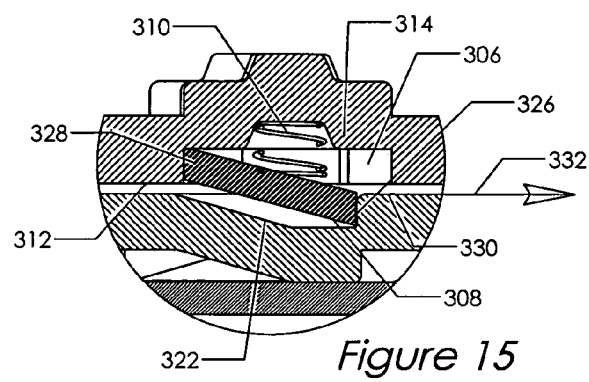
FIG. 15 illustrates an enlarged section of the device of FIGS. 12-14, taken at detail B.
Figure 13:
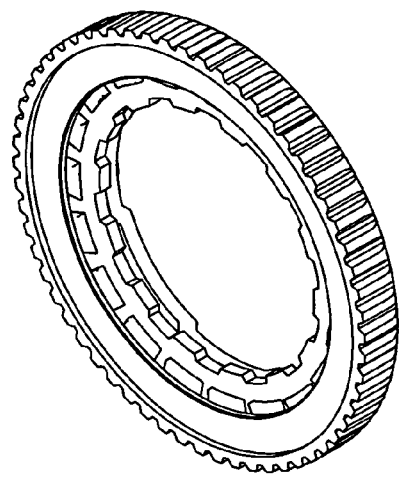
FIG. 13 diagrammatically illustrates a perspective view of the one-way device of FIG. 12.
Figure 12:
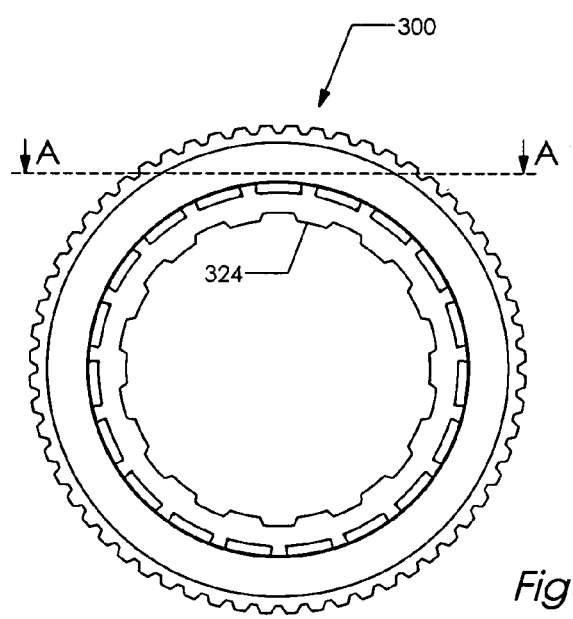
FIG. 12 diagrammatically illustrates in plan view a one-way drive device designed in accordance with a second embodiment disclosed herein, namely, what will be referred to as a partially pierced embodiment for the reasons that will become apparent hereinafter.

Still referring to FIGS. 12-15, pocket plate 302 is shown including an annular or circumferential planar surface 312 containing a series of annularly or circumferentially spaced, partially pierced pockets 306 that is, pockets with closed undersides. Like their counterparts in device 220, these pockets are configured to accommodate strut 308 and, because the pockets are closed, they also accommodate spring 310, as shown in FIG. 15. Also like its counterpart in device 220, pocket plate 302 includes torque transmitting connections 316 and an appropriately configured machined or roll formed groove 318 to accommodate retaining disc 312.

Referring now to notch plate 304, like the pocket plate, the notch plate includes an annular or circumferential planar surface 320, which contains a series of annularly or circumferential spaced notches 322, each of which has a closed or partially pierced underside, as indicated previously. The notch plate also includes torque transmitting connections 324.

Referring now primarily to FIG. 15, it should be noted that the notch 322 includes the front, strut engaging shoulder 326 while pocket 306 includes a back, strut engaging shoulder 328. Moreover, as best illustrated in FIGS. 16A-16D, the shoulder 326 in notch 322 together with annular surface 320 define an edge 330, the importance of which will be discussed hereinafter.

Overall, one-way drive device 300 is manufactured and assembled and operates, at least generally, in the manner described previously with regard to device 220. That is, the pocket plate 302 and the notch plate 304 are positioned adjacent one another such that their annular surfaces confront one another in the manner shown in FIGS. 14 and 15 with the struts and corresponding springs positioned within corresponding pockets, again as shown in FIGS. 14 and 15. These two plates are held in place by means of the retaining disc 312. Like device 220, in device 300, notch plate 304 is able to rotate freely in the direction of arrow 332 (FIG. 15) relative to the pocket plate, in which case the notch plate pushes the various struts up into their associated pockets. On the other hand, if the notch plate tends to move in the opposite direction relative to the pocket plate, as indicated by arrow 334 (FIG. 16A), the first of the struts that is caused to engage the shoulder 326 in notch 322 prevents such movement, again in the manner described previously.

Figure 16A:
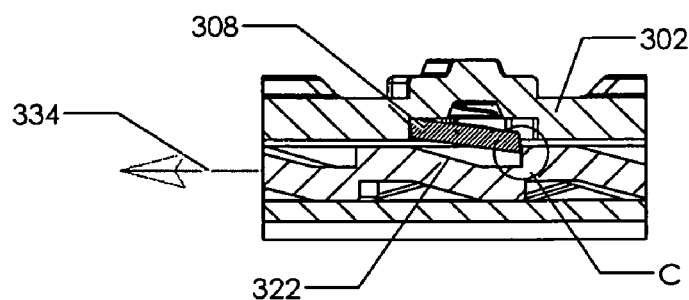
FIGS. 16A-16D diagrammatically illustrate an even greater detail residing in the detail B and, at the same time, diagrammatically illustrate an operating feature of that particular detail.
Figure 16B:
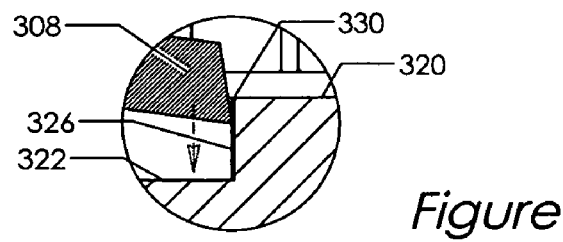
Figure 16C:
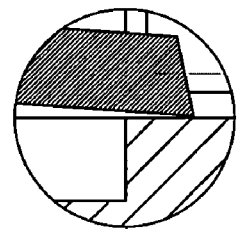
Figure 16D:
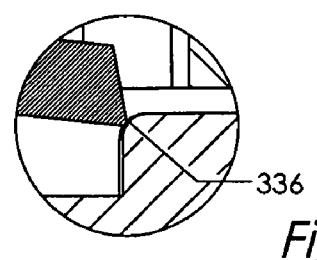

An important design aspect of the device 300 that must be taken into account in those cases where the notch plate in particular is stamp formed as opposed to being molded or machined. This is best illustrated in FIGS. 16A-16D and comes into play when a given strut 308 initially wants to engage within a notch 322 and against a strut engaging shoulder 326. FIG. 16 A shows the notch plate 304 attempting to rotate relative to pocket plate 302 in the direction opposite arrow 332, that is, in the direction of arrow 334. As a result, strut 308 starts to move into the cooperating notch 322 with the hopes of sliding in front of and thereby engaging against shoulder 326. So long as edge 330 is relatively sharp as opposed to being relatively rounded, the strut will either slip into the notch as shown in FIG. 16B and thereby lock up one-way drive device 300, or it will miss that notch altogether, as illustrated in FIG. 16C, leaving another strut to engage a notch or it will itself engage the next notch. In any case, the particular strut in question will either engage shoulder 326 or it will not. However, if edge 330 is not sufficiently sharp to cause the oncoming strut to either engage or not, it is possible for the edge of the strut to neither engage in the notch, nor pass it up, as illustrated in FIG. 16D, but rather lock itself in place or "hang-up" against edge 330, again as shown in FIG. 16D, subjecting the entire device to possible damage.

It should be noted here that this problem does not present itself in the case where the notch plate is either molded or machined since either of these methods can easily provide for a sharp edge 330. However, this is not necessarily true where the notch plate is stamp formed as in the case of notch plate 304 and in the case of previously described notch plate 224 forming part of one-way drive device 220. Indeed, Applicants have found that in the formation of the notch plate by means of stamp forming, the radius of curvature of edge 330 can be as great as 0.050 inch or greater and that such radius of curvature contributes to the problem described immediately above. Certainly, unless provided for, Applicants have found that the radius curvature of edge 330 will certainly be greater than 0.030 inch, which they have also found is the point at which strut hang-up begins to occur.

Figure 2:
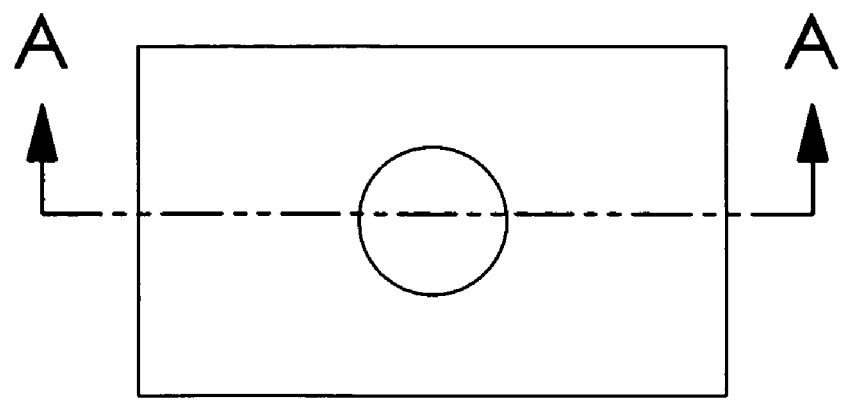
FIG. 2 diagrammatically illustrates a conventional fine blanking process that may be used to make the pocket and notch plates forming part of the overall one-way drive device disclosed herein.
Figure 2:
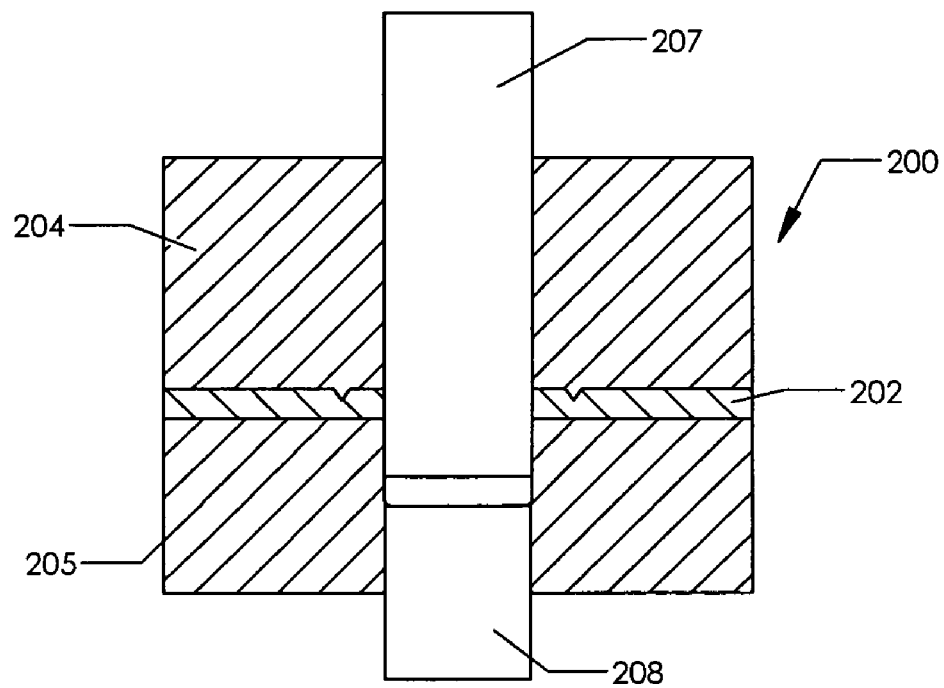
Figure 3B:
FIG. 3B is a sectional view of the notch plate of FIG. 3A, taken along the line B-B in FIG. 3A.
Figure 3D:
FIG. 3D is a sectional view of the notch plate of FIG. 3C, taken generally along line A-A in FIG. 3C.
Figure 3A:
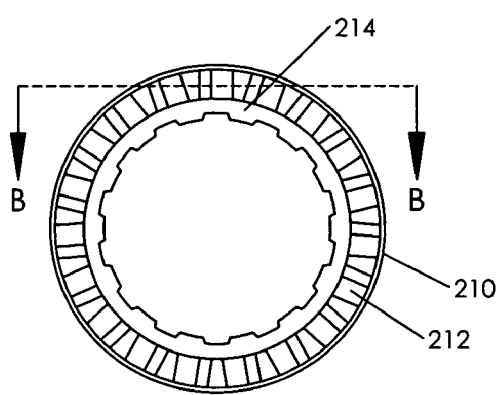
FIG. 3A is a diagrammatic illustration, in plan view, of a molded or machined notch plate that forms part of an overall one-way drive device and which illustrates a series of circumferentially or annularly spaced notches formed within its planar surface.
Figure 3C:
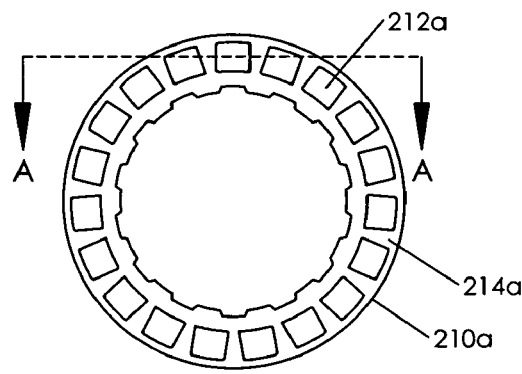
FIG. 3C is a diagrammatic illustration, in plan view, of a notch plate similar to the one in FIG. 3A, but manufactured by means of stamp forming.

Therefore, in accordance with one aspect of the present invention, Applicants make sure that the formation of the notch plate takes this into account and specifically make sure that the radius of curvature of edge 330 is no greater than bout 0.030 inch. One way to ensure this in the case of the blanking process described in conjunction with FIG. 2 is as follows.

Figure 17A:
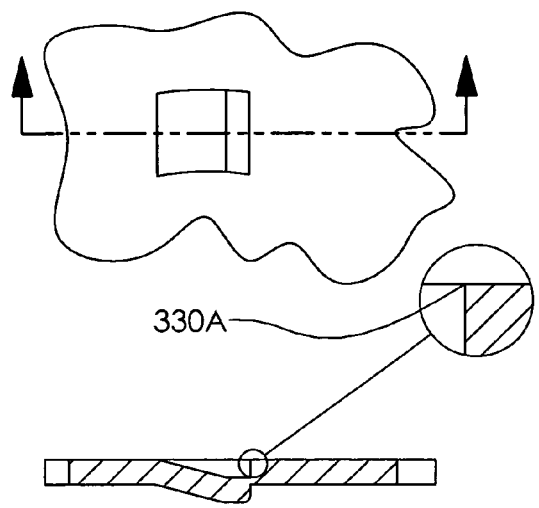
FIGS. 17A-17D diagrammatically illustrate in still further details the features relating to FIGS. 16A-16D.
Figure 17B:
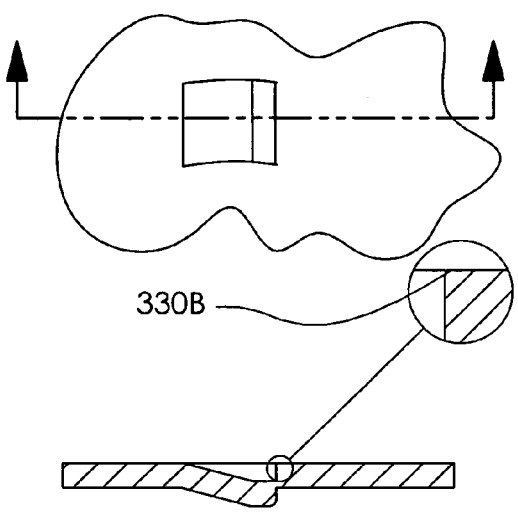
Figure 17C:
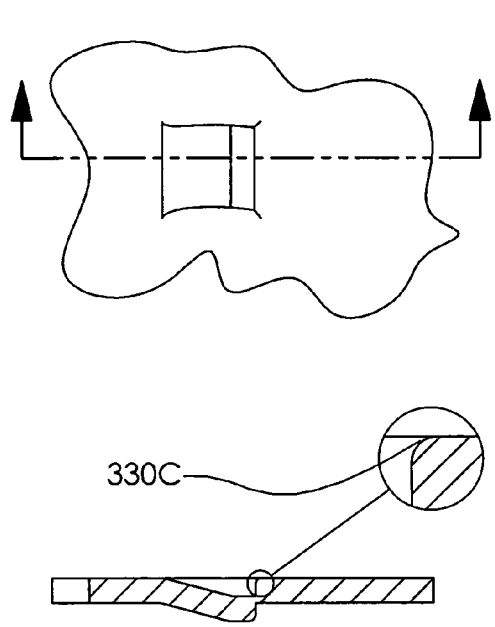

The radius of curvature of the critical edge, 330 is dependent on the condition of the stamping die, the properties of the material being stamped and the stamping conditions employed such as the clamping force, the stamping speed, and the stamping force. In FIG. 17A, critical edge 330A is shown in the most desirable configuration, a sharp, well formed, right angle. FIG. 17B shows critical edge 330B with a slight radius, approximately 0.020 inches which is still acceptable for correct functioning of the one-way clutch. FIG. 17C shows critical edge 330C as formed without taking particular care to minimize the edge radius and shows a radius greater than allowable for correct functioning of the one-way clutch.

Figure 17D:
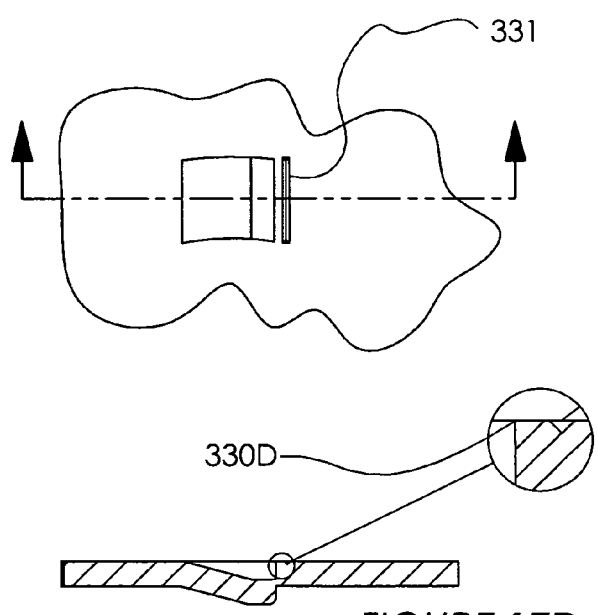

By simply maintaining the stamping dies and stamping conditions within appropriate limits, many materials can be stamp formed with critical edges 330 which have radii similar to 330A and 330B. Some desirable high strength steel materials, because of their more robust physical properties are more difficult to stamp form and cannot be formed with an acceptable radius for the critical edge 330 by simply maintaining die conditions and stamping conditions within proper limits. In these cases, a small protrusion can be added to the clamping portion of the die in order to impress a small depression into the surface of the material being stamped as shown in FIG. 17D. A small groove 331, parallel to and in close proximity to the stamped, critical edge 330D is shown formed in the surface of the material being stamped. This groove serves to hold the material securely in the immediate vicinity of the critical edge 330D while it is being stamp formed. In addition, this groove 331 displaces a small amount of material toward the critical stamped edge 330D while it is being formed. The firm holding of the material being stamped and the small amount of stamped material displacement both contribute to a well formed critical edge 330D with a small radius.

In any event, in view of the teachings herein and especially in view of the need to make sure that edge 330 is maintained at a radius of curvature no greater than 0.030 inch, one with ordinary skill in the stamp forming art could adjust the stamp forming process to ensure that end.

As a final note here, it should be emphasized here that the criticality regarding the radius of curvature of edge 330 in the case of notch plate 304 is equally applicable to the corresponding edge in notch plate 224.

Figure 18C:
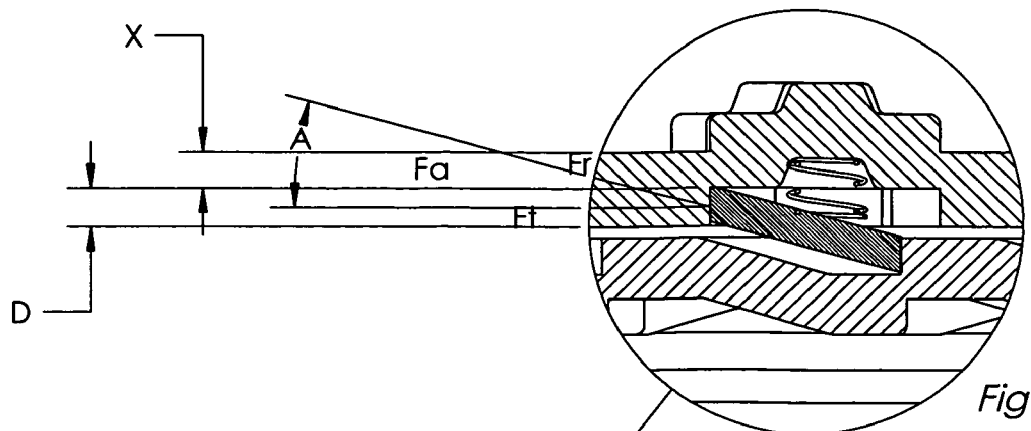
Figure 18A:
Figure 18A:
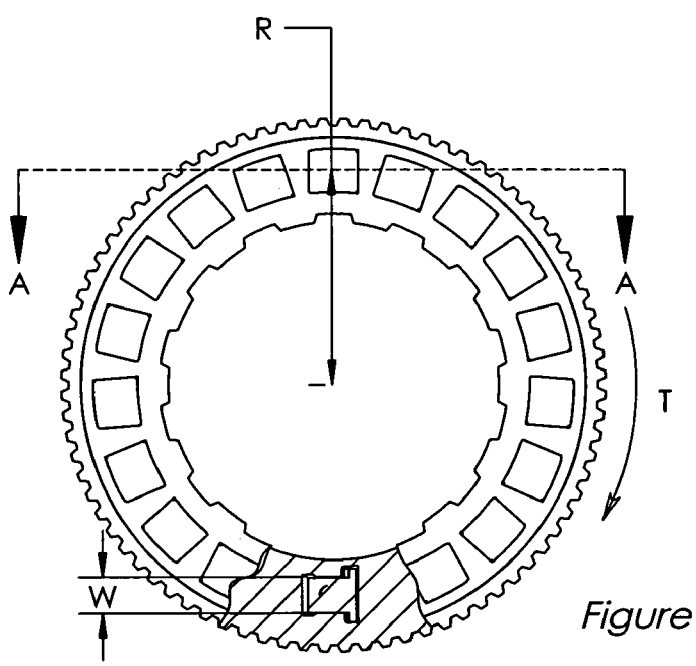

Referring now to FIGS. 18A-18C, attention is directed to a particular way in which pocket plate 302 and notch plate 304 can be integrally stamp formed to insure the structure integrity of this components of the overall one-way drive device 300. To this end, keep in mind that the overall device includes (i) an integrally stamp formed pocket plate having a planar surface including a pocket opened at the planar surface and closed at its bottom and defining a first, generally rectangular strut engaging shoulder extending from the closed bottom of the pocket to its planar surface, (ii) an integrally stamp formed notch plate having a planar surface including a notch opened at the planar surface and closed at its bottom and defining a second, generally rectangular strut engaging shoulder extending from the closed bottom of the notch to its planar surface and (iii) a coupling arrangement for locking together and unlocking said pocket and notch plates, said coupling arrangement including at least one strut having opposite, generally rectangular ends configured to engage said first and second shoulders when the coupling member locks said plates together.

Applicants have established a relationship between the desired height of the strut engaging shoulder in both the pockets of the pocket plate and the notches of the notch plate and the thickness of the starting material blanks used to integrally stamp form the pocket and notch plates. In particular, applicants have found that to insure that each of these shoulders has a height (which we will call D) from its closed underside or bottom to the top of the pocket or notch at the planar surface of the plate, the initial blank material thickness (which we will call T) must be at least 1.36D where the blank material is steel. This is established in the following way with reference to FIGS. 18A-18C, which as stated previously correspond to FIGS. 12, 14 and 15. However, FIGS. 18A-18C notate the following variables, equations, comments and conclusions:

D=Axial depth of the load bearing face of notch or pocket
X=Axial thickness of unsheared material remaining after stamping
W=Width of the load bearing face of notch or pocket
T=Thickness of the sheet from which parts are fabricated
R=Radius from the centerline of the device to the center of the strut face(s)
Ft=Applied torque related force on the active notch or pocket face
Fa=Axially directed resultant force on the notch or pocket bottom surface
Fr=Resultant total compressive force on the strut
A=Angle between the engaged strut and the faces of the notch and pocket plates
Sd=Strut/Plate contact stress
Ssx=Cavity bottom shear stress
Su=Allowable tensile stress
Ssu=Allowable shear stress
P=Allowable shear stress fraction $$Sd = \frac{Ft}{DW} \quad Ft = \frac{T}{R} \quad Sd = \frac{T}{DRW}$$
$$Ssx = \frac{Fa}{XW} \quad Fa = \frac{T\tan A}{R} \quad Ssx = \frac{T\tan A}{XRW}$$

Ssu=PSu Relationship between allowable shear and allowable tensile stress for material Substituting the Sd and Ssx for this geometry into this equation yields:

$$\frac{T\tan A}{XRW} = P\frac{T}{DRW}$$

Solving for X, $$X = \frac{\tan A}{P}D$$

For a typical device geometry, A=15°

For steel sheet, the approximate value of P is 0.75, that is:

Ssu=Approx 0.75×Su

So:

$$X = \frac{\tan 15}{.15} \quad D = \frac{.27}{.75} \quad D = .36D$$

The thickness of unsheared material should be greater than about 0.36 of the strut contact surface depth. That is to say that the steel sheet from which the part is to be stamped, that is, the initial blank should be at least 1.36 times the strut contact depth (T=1.36D).

What is claimed is:

1. A one-way drive device, comprising:
   (a) a first member mounted for rotation about a given axis and defining (i) a first planar surface normal to said axis and (ii) a first shoulder within said first planar surface, said first member being integrally stamp formed into a single unit
   (b) a second member mounted for rotation about said given axis and defining (i) a second planar surface which is positioned in close proximity to and in confronting relationship with said first planar surface and (ii) a second shoulder within said second planar surface, said second member being integrally stamp formed into a single unit; and
   (c) a coupling arrangement including at least one strut movable between (i) a first position so as to allow said first member to rotate about said axis in one direction relative to the second member and (ii) a second position in simultaneous engagement with said first and second shoulders so as to prevent said first member from rotating about said axis in the opposite direction relative to said second member;
   (d) wherein said integrally stamp formed first member includes at least one pocket having a closed underside integrally stamp formed into the first planar surface so as to define said first shoulder, wherein said integrally stamp formed second member includes at least one notch having a closed underside integrally stamp formed into the second planar surface so as to define said second shoulder, and wherein said strut is disposed at least partially within said pocket for movement between said first and second positions; and
   (e) wherein said second shoulder and the second planar surface of said second member together define an outer edge having a radius of curvature no greater than about 0.030 inch, and said second planar surface has a stamped groove therein extending parallel to and in close proximity to the outer edge.

2. A one-way drive device according to claim 1 wherein said coupling arrangement includes means for biasing said strut in its second position.

3. A one-way drive device, comprising:
   (a) a first member mounted for rotation about a given axis and defining (i) a first planar surface normal to said axis and (ii) a first shoulder within said first surface, said first member being integrally stamp formed into a single unit;
   (b) a second member mounted for rotation about said given axis and defining (i) a second planar surface which is positioned in close proximity to and in confronting relationship with said first surface and (ii) a second shoulder within said second surface, said second member being integrally stamp formed into a single unit; and (c) a coupling arrangement including at least one strut movable between (i) a first position so as to allow said first member to rotate about said axis in one direction relative to the second member and (ii) a second position in simultaneous engagement with said first and second shoulders so as to prevent said first member from rotating about said axis in the opposite direction relative to said second member;

(d) wherein said integrally stamp formed first member includes at least one pocket having an open underside integrally stamp formed into its planar surface so as to define said first shoulder, wherein said integrally stamp formed second member includes at least one notch having an open underside integrally stamp formed into its planar surface so as to define said second shoulder, and wherein said strut is disposed at least partially within said pocket for movement between said first and second positions; and (e) wherein said second shoulder and the planar surface of said second member together define a first outer edge, wherein said strut includes opposing first and second shoulders configured to respectively engage simultaneously the first and second shoulders of said first and second members when said strut is in said second position, and wherein said strut includes a nosed segment extending out from its second shoulder so as to rest on the planar surface of said second member at said first outer edge when the strut is in said second position, whereby to aid in preventing said strut from falling through the open underside of said notch.

4. A one-way drive device according to claim 3 wherein said notch includes a shoulder opposing said second shoulder, wherein said opposing shoulder and the planar surface of said second member define a second outer edge, and wherein the first shoulder defined by the pocket of said first member and said second outer edge are positioned relative to one another when said strut is in said second position such that when said strut begins moving from said second position towards its first position as said first member begins moving in said one direction relative to said second member, said second edge aids in preventing said strut from falling through the open underside of said notch.

5. A one-way drive device, comprising:

(a) a first member mounted for rotation about a given axis and defining (i) a first planar surface normal to said axis and (ii) a first shoulder within said first surface;

(b) a second member mounted for rotation about said given axis and defining (i) a second planar surface which is positioned in close proximity to and in confronting relationship with said first surface and (ii) a second shoulder within said second surface; and (c) a coupling arrangement including at least one strut movable between (i) a first position so as to allow said first member to rotate about said axis in one direction relative to the second member and (ii) a second position in simultaneous engagement with said first and second shoulders so as to prevent said first member from rotating about said axis in the opposite direction relative to said second member; and (d) wherein said first member includes at least one pocket having an open underside so as to define said first shoulder, wherein said second member includes at least one notch having an open underside so as to define said second shoulder, and wherein said strut is disposed at least partially within said pocket for movement between said first and second positions; and (e) wherein said strut includes opposing first and second shoulder configured to respectively engage simultaneously the first and second shoulders of said first and second members when said strut is in said second position, and wherein said strut includes a nosed segment extending out from its second shoulder so as to rest on the planar surface of said second member at said first outer edge when the strut is in said second position, whereby to aid in preventing said strut from falling through the open underside of said notch.

6. A one-way drive device according to claim 5 wherein said notch includes a shoulder opposing said second shoulder, wherein said opposing shoulder and the planar surface of said second member define a second outer edge, and wherein the first shoulder defined by the pocket of said first member and said second outer edge are positioned relative to one another when said strut is in said second position such that when said strut begins moving from said second position towards its first position as said first member begins moving in said one direction relative to said second member, said second edge aids in preventing said strut from falling through the open underside of said notch.

7. A one-way drive device, comprising: (a) a first, pocket member mounted for rotation about a given axis and defining (i) a first planar surface, annularly configured about and normal to said axis and (ii) a plurality of pockets extending into said first planar surface each of said pockets having a closed underside and defining a first shoulder, said pocket member including the pockets and first shoulders being integrally stamp formed into a single unit;

(a) a second, notch member mounted for rotation about said given axis and defining (i) a second planar surface, annularly configured about and normal to said axis and (ii) a plurality of notches extending into said second planar surface each of said notches having a closed underside and defining a second shoulder, said notch member including the notches and second shoulders being integrally stamp formed into a single unit; and (c) a coupling arrangement including a plurality of struts each of said struts being disposed at least partially within in a respective one of said pockets and mounted for movement therein between (i) a first position so as to allow said pocket member to rotate about said axis in one direction relative to the notch member and (ii) a biased second position in simultaneous engagement with said first and second shoulders so as to prevent said pocket member from rotating about said axis in the opposite direction relative to said notch member; and (d) wherein said second shoulder of each of said notches and the planar surface o f said notch member together define an outer edge having a radius of curvature no greater than about 0.030 inch, and said second planar surface has stamped grooves therein extend parallel to and in close proximity to the outer edges.

8. A one-way drive device, comprising:

(a) a pocket plate mounted for rotation about a given axis and defining (i) a first planar surface normal to said axis and (ii) a pocket including a first shoulder within said first planar surface;

(b) a notch plate mounted for rotation about said given axis and defining (i) a second planar surface which is positioned in close proximity to and in confronting relationship with said first planar surface and (ii) a notch including a second shoulder within said second planar surface, said notch plate being integrally stamp formed into a single unit; and (c) a coupling arrangement including at least one strut disposed at least partially within said pocket and movable between (i) a first position so as to allow said pocket plate to rotate about said axis in one direction relative to the notch plate and (ii) a second position in simultaneous engagement with said first and second shoulders so as to prevent said pocket plate from rotating about said axis in the opposite direction relative to said notch plate; and (d) wherein said second shoulder and the second planar surface of said notch plate together define an outer edge having a radius of curvature no greater than about 0.030 inch. and wherein said second planar surface has a stamped groove therein extend parallel to and in close proximity to the outer edge of the notch.

9. A notch plate for use in a one-way drive device including: (i) a pocket plate mounted for rotation about a given axis and defining (1) a first planar surface normal to said axis and (2) a pocket within said first planar surface; (ii) said notch plate; and (iii) a coupling arrangement including at least one strut disposed at least partially within said pocket and movable between (1) a first position so as to allow said pocket plate to rotate about said axis in one direction relative to the notch plate and (2) a second position so as to prevent said pocket plate from rotating about said axis in the opposite direction relative to said notch plate, said notch plate comprising:

(a) an integrally stamp formed unitary main body adapted to be mounted for rotation about said given axis and defining a second planar surface which is positionable in close proximity to and in confronting relationship with said first planar surface of said pocket plate; and (b) a notch including a strut engaging shoulder, said notch plate being integrally stamp formed into said main body; and (c) wherein said strut engaging shoulder and the second planar surface of said main body together define an outer edge having a radius of curvature no greater than about 0.030 inch. and wherein said second planar surface has a stamped groove therein extending parallel to and in close proximity to the outer edge of each notch.

10. In a one-way drive device including (i) an integrally stamp formed pocket plate having a planar surface including a pocket opened at the planar surface and closed at its bottom and defining a first, generally rectangular strut engaging shoulder extending from the closed bottom of the pocket to its planar surface, (ii) an integrally stamp formed notch plate having a planar surface including a notch opened at the planar surface and closed at its bottom and defining a second, generally rectangular strut engaging shoulder extending from the closed bottom of the notch to its planar surface and (iii) a coupling arrangement for locking together and unlocking said pocket and notch plates, said coupling arrangement including at least one strut having opposite, generally rectangular ends configured to engage said first and second shoulders when the coupling member locks said plates together, a method of making said integrally stamp formed notch plate, comprising:

(a) establishing the desired configuration of said second strut engaging shoulder including its height D from the bottom of its notch to its planar surface;

(b) selecting a starting blank of material to be integrally stamp formed into the notch plate, said blank having a substantially uniform thickness equal to at least about 1 .36D, whereby to insure that said strut engaging shoulder has a height of at least D after the notch plate has been stamp formed; and (c) integrally stamp forming the blank of material into said notch plate.

11. The method of claim 10, wherein said strut engaging shoulder and said planar surface of said notch plate together define an outer edge, and the method further comprises stamping a groove into the planar surface of said notch plate that extends parallel to and in close proximity to said edge so as to displace material towards said edge.

12. In a one-way drive device including (i) an integrally stamp formed pocket plate having a planar surface including a pocket opened at the planar surface and closed at its bottom and defining a first, generally rectangular strut engaging shoulder extending from the closed bottom of the pocket to its planar surface, (ii) an integrally stamp formed notch plate having a planar surface including a notch opened at the planar surface and closed at its bottom and defining a second, generally rectangular strut engaging shoulder extending from the closed bottom of the notch to its planar surface and (iii) a coupling arrangement for locking together and unlocking said pocket and notch plates, said coupling arrangement including at least one strut having opposite, generally rectangular ends configured to engage said first and second shoulders when the coupling member locks said plates together, a method of making said integrally stamp formed pocket plate, comprising:

(a) establishing the desired configuration of said first strut engaging shoulder including its height D from the bottom of its pocket to its planar surface;

(b) selecting a starting blank of material to be integrally stamp formed into the pocket plate, said blank having a substantially uniform thickness equal to at least about 1 .36D, whereby to insure that said strut engaging shoulder has a height of at least D after the pocket plate has been stamp formed; and (c) integrally stamp forming the blank of material into said pocket plate.

* * * * *